United States Patent Office 3,309,395
Patented Mar. 14, 1967

3,309,395
PRODUCTION OF ACRYLONITRILE OR METHACRYLONITRILE
Heinz Nohe, Ludwigshafen (Rhine), and Christof Palm and Rolf Platz, Mannheim, Germany, assignors to Badische Anilin- & Soda-Fabrik Aktiengesellschaft, Ludwigshafen (Rhine), Germany
No Drawing. Filed May 28, 1964, Ser. No. 371,090
Claims priority, application Germany, June 1, 1963, B 72,152
11 Claims. (Cl. 260—465.3)

This invention relates to the production of acrylonitrile and methacrylonitrile from propylene and isobutylene by oxidation with oxygen in the presence of ammonia. More specifically, the invention relates to the use of a new catalyst in the said reaction.

The production of $\alpha,\beta$-unsaturated nitriles from $\alpha,\beta$-unsaturated alkenes by oxidation with oxygen in the vapor phase in the presence of ammonia in contact with various catalysts is known. The prior art catalysts contain mainly phosphates, molybdates and tungstates in complex form with certain additives, so that salts of heteropoly acids are usually assumed to be the active constituents. Bismuth, tin and antimony salts of molybdic acid, phosphomolybdic acid and phosphotungstic acid are given as examples of such catalysts in U.S. Patent No. 2,904,580. U.S. Patent No. 2,691,037 describes as suitable catalysts quite generally metals, oxides or other compounds of copper, chromium, vanadium, manganese, iron, nickel, cobalt, molybdenum, silver, zinc, cadmium, tin, tungsten, rhenium, lead, platinum, gold, aluminum, palladium, rhodium, bismuth and uranium, and also all catalysts which are known for the oxidation of naphthalene to phthalic anhydride and of benzene to maleic anhydride.

From this long list however only a few can in fact be regarded as effective, i.e., only a few will give acrylonitrile or methacrylonitrile in about 5% by volume in the gas mixture when the gases are passed over the catalysts under favorable conditions. With all the prior art catalysts, polymeric products are formed in considerable quantities by secondary reactions, and these lead to resinification and stoppages in the apparatus. Such resinification and stoppages in industrial apparatus necessitate repeated interruptions in operation, and much labor must be used for cleaning.

The present invention is an improvement in a process of the type disclosed in U.S. Patent No. 3,050,546.

It is an object of the present invention to provide a process for the catalytic production of acrylonitrile from propylene, oxygen and ammonia, in which process, while obtaining high yields, less resin type byproducts is obtained than in the conventional method. It is further an object of the invention to provide a new catalyst for the production of acrylonitrile from propylene, ammonia and oxygen in a one-stage reaction.

These and other objects of the invention are achieved in the production of acrylonitrile from propylene or of methacrylonitrile from isobutylene by oxidation with molecular oxygen in the presence of ammonia by using as the catalyst a tin salt of a boromolybdate heteropoly acid. This new catalyst may be mixed with catalysts for the said reaction which are known in the art.

Boromolybdic acids are known (see for example H. J. Emeleus and J. S. Anderson, Ergebnisse and probleme der modernen anorganischen Chemie, 2nd edition, Berlin, 1954, page 207). A tin salt may for example have the formula: $Sn_5[BO_4.Mo_{12}O_{18}(OH)_{36}]_2$, equivalent to an analysis of 12.28% of Sn, 0.5% of B and 47.5% of Mo, or 17.6% of $Sn_2$, 1.63% of $B_2O_3$ and 80.7% of $MoO_3$. These heteropoly acid salts are complex compounds of various molecular weights but are characterized by the fact that the tin is connected through oxygen only to boron and molybdenum atoms without any other hetero atoms being present, i.e. the acid salts contain only tin, boron and molybdenum in addition to the oxygen and hydrogen atoms. For purposes of definition in the following specification and claims, these complex compounds will be referred to as "the tin salt of boromolybdic acid" or more simply as "the tin-boromolybdate" with the understanding that these terms are intended to include all of such complex compounds regardless of their molecular weight. In addition to the tin salt of boromolybdic acid, it is also possible for an excess of one or other component to be present, for example tin molybdate, tin borate, boron molybdate or boric acid alone, so that mixtures of tin salts of the boromolybdate acid are present with the other component. The catalyst does not however contain any phosphorus compounds. In general, the weight ratio of stannic oxide to molybdenum oxide used is from 10:1 to 1:10, preferably 2:1 to 1:2, and of boron oxide to molybdenum oxide from 1:2 to 1:50, preferably 1:2 to 1:10. In these mixtures the amount of tin salt of boromolybdic acid should be about 10 to 100% by weight, with reference to the sum of the oxides of tin, boron and molybdenum.

The catalyst is preferably used on a carrier, particularly on silica gel, advantageously with a bulk density of 0.3 to 2.0 g./cm.$^3$. The proportion of carrier may vary within wide limits, for example from 30 to 95% by weight; it is advantageous to use about 65% to 80% by weight of carrier material.

Production of the catalyst is by conventional methods, for example by impregnating the carrier with suitable solutions of tin-boron-molybdenum salts and subsequent drying, by co-precipitation of silica gel and the tin boromolybdate and subsequent drying, or by applying the tin salt of boromolybdic acid in molten form, advantageously in the presence of a flux such as urea or oxalic acid, for example in a fluidized bed at a temperature of about 100° to 400° C. Solutions of tin chloride or tin acetate, boric acid and molybdic acid or ammonium molybdate, are for example suitable for the production of the solutions used for impregnation or for the production of the precipitated catalysts. The following amounts may be used together with 100 parts of carrier: 5.8 to 258.5 g. tin chloride, 9.6 to 72.5 g. boric acid, and 3.3 to 145.2 g. ammonium molybdate provided the content of oxides in the salt is in agreement with the amounts disclosed above.

Depending on the method of production, the particle size is determined by spraying, by extrusion or by grinding. For the fluidized bed method a grain size of from 0.05 to 0.4 mm. is in general preferred, while for stationary bed catalysts grain sizes of 1 to 5 mm. are advantageous. The catalysts usually have internal surfaces of 10 to 400 m.$^2$/g.

Conventional oxidation conditions are suitable for the process.

Propylene or isobutylene is used in pure form. Oxygen may also be used in pure form, but air is generally used. Ammonia is also used pure. Inert gases, such as nitrogen or carbon monoxide or carbon dioxide, and also hydrocarbons, such as methane, ethane, propane, or other saturated gaseous hydrocarbons which are inert under the conditions are not injurious. To control the heat balance of the reaction steam is frequently added as inert gas. The ammonia may be previously mixed with the hydrocarbon, the oxygen and any other gases, but the ammonia may also be first mixed with the other reactants and the inert gases in the reactor. This method is suitable when a fluidized catalyst is used.

The ratio of olefin to oxygen and ammonia may be seen from the equation:

$$2R\text{---}CH_3 + 3O_2 + 2NH_3 = 2R\text{---}CN + 6H_2O$$

in which R may denote the radical $CH_2=CH-$ or the radical $$CH_2=\underset{\underset{CH_3}{|}}{C}-$$

Oxygen and ammonia may be used in excess. Molar ratios of propylene (or isobutylene) to oxygen of 1:0.5 to 1:3, preferably 1:0.7 to 1:1.8, and molar ratios of propylene (or isobutylene) to ammonia of 1:0.05 to 1:5, preferably 1:0.5 to 1:2, are used. Oxygen-containing byproducts are formed to an increased extent at ratios of ammonia to propylene or isobutylene which deviate appreciably from the molar ratio 1:1.

Since the process is usually carried out in the presence of inert gases, it is advantageous to use air as the source of oxygen. If steam is added as an additional inert gas, an amount of 0.25 to 10 moles per mole of propylene (or isobutylene) is advantageous. It is preferred to use gas mixtures containing from 1 to about 15% by volume, particularly from 4 to 8% by volume, of propylene or isobutylene. The gas leaving the catalyst may be recycled after the acrylonitrile (or methacrylonitrile) has been separated. In this case it is advantageous to use ammonia in excess as the inert gas instead of nitrogen and to meter in pure oxygen. The reaction is carried out at from 400° to 580° C., advantageously from 450° to 530° C.

The residence period of the gas in contact with the catalyst may be varied; it is preferably about 0.5 to 3.5 seconds, particularly 1.5 to 2.5 seconds. The residence period is defined as the quotient of the volume of catalyst in the quiescent state and the gas volume under operating conditions.

The catalyst may be stationary, but it is preferred to keep it in fluidization.

The process is usually carried out at atmospheric pressure, but it may be carried out also at a pressure slightly below atmospheric, for example at 400 mm. Hg, or at a pressure slightly above atmospheric, for example 2 atmospheres gauge.

The reaction is carried out in a conventional way by passing the gas mixture (which may be prepared by mixing in a mixing vessel or, when steam is entrained, simply by passage through water at a temperature corresponding to the desired partial vapor pressure) at the reaction temperature over the catalyst heated to the reaction temperature, cooling the reaction gas so that the added water is condensed out and then carrying out the separation of the nitrile by a conventional method, for example by washing with water or an organic solvent. Besides the advantage that less resinous products are formed when using the new catalyst, the new catalyst also has a high insensitivity to sulfur compounds.

The invention will be further illustrated in the examples, Examples A to D illustrating the preparation of suitable catalysts, and Examples 1 to 9 illustrating their use in the production of the nitriles. In the examples, the following definitions are used:

$$\text{Percent yield:} \frac{\text{moles of compound formed}}{\text{moles of propylene reacted}} \times 100$$

$$\text{Percent conversion:} \frac{\text{moles of compound formed}}{\text{moles of propylene fed}} \times 100$$

$$\text{Percent conversion rate:} \frac{\text{moles of propylene reacted}}{\text{moles of propylene fed}} \times 100$$

(a) Tin boromolybdate catalysts may be prepared by the following methods:

*Example A*

201 g. of ammonium molybdate is dissolved in 450 ml. of water by heating to 60° C. and 100 g. of boric acid is added. A solution of 365 g. of stannous chloride in 450 ml. of water is added and the whole made alkaline with a half concentrated ammonia solution. The precipitate, while still moist, is kneaded with 1060 g. of silica gel in a kneader. The catalyst is dried and annealed at 450° to 550° C., the chlorine thus being removed as ammonium chloride. The catalyst A has the following composition: 16.5% of $SnO_2$+3.7% of $B_2O_3$+10.7% of $MoO_3$+69.1% of $SiO_2$. Similar catalysts are prepared in an analogous way using other proportions.

*Example B*

37.5 g. of ammonium molybdate is dissolved in 300 ml. of water by heating. 18.7 g. of boric acid is introduced slowly with stirring. Then a solution of 66.5 g. of tin chloride in 200 ml. of water is added. 200 g. of silica gel having a grain size of 0.05 to 0.4 mm. is added immediately to the brown suspension formed, the liquid thus being completely absorbed. The catalyst is dried at 110° C. and then fluidized for three hours with air and for one hour with ammonia in a fluidization reactor at 450° C.

The catalyst B has the following composition: 15.6% of $SnO_2$+3.7% of $B_2O_3$+10.7% of $MoO_3$+70% of $SiO_2$.

Catalysts having a great variety of compositions may be prepared in an analogous way using other proportions.

*Example C*

The procedure of Example A is followed but the metal salt solutions are added to 2000 g. of 25% silica sol, made ammoniacal and dried and the precipitated catalyst C is annealed at 450° C. The amounts of the metal salts used are varied.

*Example D*

A clear solution of 133 g. of ammonium molybdate and 66 g. of boric acid in 1 liter of water is stirred into 3 liters of 25% silica sol. While heating and mixing vigorously, 660 ml. of an acetic acid solution of 150 g. of stannous oxide is then allowed to flow into the ammonium molybdate-boric acid-silica sol solution. The mixture is evaporated to a pasty consistency, dried at 150° C. and then calcined for twelve hours at 500° C.

The catalyst has the following composition: 16.0% of $SnO_2$+3.7% of $B_2O_3$+10.7% of $MoO_3$+69.6% of $SiO_2$.

(b) Acrylonitrile (or methacrylonitrile) may be prepared as follows:

*Example 1*

400 ml. of the finished annealed catalyst prepared according to Example B and having a grain size of 0.05 to 0.4 mm. is heated to a reaction temperature of 500° C. in a vertical reaction tube having a diameter of 60 mm. which is provided at the bottom with a gas permeable frit. A mixture of 12 liters of propylene, 12 liters of ammonia, 90 liters of air and 80 liters of steam is passed per hour upwardly through the catalyst. The gas mixture keeps the catalyst fluidized. The residence period is 2.6 seconds.

The gas mixture introduced has the following volumetric composition:

| | Percent |
|---|---|
| Propylene | 6.2 |
| Ammonia | 6.2 |
| Oxygen | 9.3 |
| Nitrogen | 37.0 |
| Steam | 41.3 |

The gas leaving the reactor is passed through a condenser to condense the steam and is then washed to separate acrylonitrile.

The acrylonitrile content is determined direct in the reaction gas by infrared spectroscopy and gas chromatography.

Acetonitrile and hydrocyanic acid—about 10% of the acrylonitrile content—are obtained as byproducts. When using tin-boron-molybdenum catalysts, the acrolein content is below analytically detectable limits (less than 50 p.p.m.).

The yield of acrylonitrile, with reference to reacted propylene, is 73.0%, and the yield of hydrocyanic acid is 7.1% and of acetonitrile 6.4% of the theory.

Conversion to acrylonitrile, with reference to propylene supplied, in a single passage is 50.5%, conversion to hydrocyanic acid is 4.9% and to acetonitrile 4.4%. This is equivalent to a total conversion of propylene of 59.8% into useful nitrogenous products. The conversion rate was 69.2%.

*Example 2*

The reaction is carried out as described in Example 1 while supplying 130 liters of steam per hour. The residence period is 2.0 seconds.

The gas mixture introduced has the following volumetric composition:

|  | Percent |
|---|---|
| Propylene | 4.9 |
| Ammonia | 4.9 |
| Oxygen | 7.4 |
| Nitrogen | 29.5 |
| Steam | 53.3 |

The yield and conversion are as in Example 1.

*Example 3*

200 ml. of the finished annealed catalyst prepared according to Example A is placed in the reactor described in Example 1. The reaction is carried out in a manner analogous to that of Example 1. The reaction temperature is 510° C. The gas mixture to be reacted has the following volumetric composition:

|  | Percent |
|---|---|
| Propylene | 6.2 |
| Ammonia | 6.2 |
| Oxygen | 9.3 |
| Nitrogen | 37.0 |
| Steam | 41.3 |

The residence period is 1.3 seconds. The total conversion to acrylonitrile, hydrocyanic acid and acetonitrile was 65.3%. The yield of acrylonitrile is 66.5%, the yield of hydrocyanic acid is 7.8% and the yield of acetonitrile is 4.6% of the theory. The total yield is 78.9%. The conversion rate is 82.8%.

*Examples 4 to 7*

The results in the following table are obtained in experiments carried out in the way described in Example 1:

*Example 8*

330 ml. of catalyst prepared according to Example B and having a grain size of 0.1 to 0.4 mm. is brought to a reaction temperature of 470° C. in a fluidization vessel of quartz having a diameter of 60 mm. and provided at the bottom with a gas-permeable frit. A mixture of 12 liters of isobutylene, 12 liters of ammonia, 90 liters of air and 60 liters of steam per hour is passed upwardly through the catalyst. The gas mixture keeps the catalyst fluidized. The residence period of the gas mixture in contact with the catalyst is 2.5 seconds.

Components which are liquid at room temperature, such as water and methacrylonitrile, are condensed from the gas leaving the reactor by means of intense coolers and cooling traps cooled to −70° C. Determination of the content of methacrylonitrile is carried out by infrared spectoscopy and gas chromatography.

Acetonitrile and hydrocyanic acid—about 10% of the methacrylonitrile content—and acrylonitrile—about 5% of the methacrylonitrile content—are obtained as byproducts.

The yield of methacrylonitrile, with reference to reacted isobutylene, is 48%.

Conversion to methacrylonitrile, with reference to isobutylene supplied, is 24.5%.

*Example 9*

300 ml. of catalyst, prepared according to Example B and having the composition 13.1% of $SnO_2$, 11.7% $MoO_3$, 3.2% of $B_2O_3$ and 72.0% of $SiO_2$ and a grain size of 0.1 to 0.4 mm. is contacted at a reaction temperature of 500° C. in a fluidization vessel having a diameter of 60 mm. with 18 liters of propylene, 18 liters of ammonia, 135 liters of air and 70 liters of steam per hour. The gas mixture introduced has the volumetric composition:

|  | Percent |
|---|---|
| Propylene | 7.5 |
| Ammonia | 7.5 |
| Oxygen | 11.2 |
| Nitrogen | 44.8 |
| Steam | 29.0 |

The residence period is 1.6 seconds.

The following results are obtained after the experiment has been continued for two thousand two hundred hours:

|  | Percent |
|---|---|
| Yield of acrylonitrile | 66 |
| Conversion to acrylonitrile | 57.5 |

|  | Example | | | |
|---|---|---|---|---|
|  | 4 | 5 | 6 | 7 |
| Catalyst prepared by method | A | B | C | D |
| Composition of catalyst, percent: | | | | |
| $SnO_2$ | 16.5 | 11.0 | 13 | 16 |
| $B_2O_3$ | 3.7 | 4.0 | 0.5 | 3.7 |
| $MoO_3$ | 10.7 | 15.0 | 11.5 | 10.7 |
| $SiO_2$ | 69.1 | 79 | 75 | 69.6 |
| Reaction temperature, °C | 470 | 480 | 480 | 470 |
| Gas composition in percent by volume: | | | | |
| Propylene | 4.9 | 6.2 | 4.9 | 4.9 |
| Ammonia | 4.9 | 6.2 | 4.9 | 4.9 |
| Oxygen | 7.4 | 9.3 | 7.4 | 7.4 |
| Nitrogen | 29.5 | 37.0 | 29.5 | 29.5 |
| Steam | 53.3 | 41.3 | 53.3 | 53.3 |
| Residence period (in seconds) | 2.0 | 2.6 | 2.0 | 2.0 |
| Conversion of propylene | 78 | 73 | 82.6 | 75 |
| Yield of— | | | | |
| Acrylonitrile | 68 | 74 | 63 | 72 |
| Hydrocyanic acid | 8.7 | 7.3 | 8.2 | 8.5 |
| Acetonitrile | 5.8 | 4.5 | 6.3 | 5.0 |

Hydrocyanic acid (yield 9.5%, conversion 8.25%) and acetonitrile (yield 6.8%, conversion 5.9%) are obtained as byproducts. The yield of useful nitrogen compounds is therefore 82.3% and the conversion to useful nitrogen compounds is 71.65%. The conversion rate is 87.1%.

We claim:
1. A process for the production of a nitrile of the formula

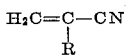

in which R denotes a substituent selected from the group consisting of hydrogen and methyl, said process comprising the step of reacting in the vapor phase at a temperature of about 400° C. to 580° C. a mixture of
(A) a hydrocarbon of the formula

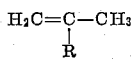

in which R has the same meaning as above,
(B) ammonia, and
(C) oxygen in the presence of a catalyst consisting essentially of 10 to 100% by weight of the tin salt of boromolybdic acid and 0 to 90% by weight of a compound selected from the group consisting of boric acid, molybdic acid, boronmolybdate, tin borate and tin molybdate, wherein the ratio by weight of tin to molybdenum in said catalyst calculated as their oxides is from 10:1 to 1:10 and wherein the ratio by weight of boron to molybdenum in said catalyst calculated as their oxides is from 1:2 to 1:50.

2. A process as claimed in claim 1 wherein said ratio by weight of tin to molybdenum is in the range from 2:1 to 1:2 and of boron to molybdenum of from 1:2 to 1:10.

3. A process as claimed in claim 1 wherein said catalyst is supported on about 30 to 95% by weight of an inert carrier.

4. A process as claimed in claim 3 wherein said carrier consists essentially of silica.

5. A process as claimed in claim 4 wherein said carrier is silica gel having a bulk density of 0.3 to 2.0 g./cm$^3$.

6. A process as claimed in claim 1 wherein the molar ratio of ammonia to the hydrocarbon reactant (A) is about 0.05:1 to 5:1.

7. A process as claimed in claim 1 wherein the molar ratio of ammonia to the hydrocarbon reactant (A) is about 0.5:1 to 2:1.

8. A process as claimed in claim 1 wherein the molar ratio of oxygen to the hydrocarbon reactant (A) is 0.5:1 to 3:1.

9. A process as claimed in claim 1 wherein said hydrocarbon reactant (A) is propylene.

10. A process as claimed in claim 1 wherein said hydrocarbon reactant (A) is isobutylene.

11. A process as claimed in claim 1 wherein the reaction is carried out in a fluidized bed of the catalyst.

References Cited by the Examiner
FOREIGN PATENTS
957,022  5/1964  Great Britain.

CHARLES B. PARKER, *Primary Examiner.*

J. P. BRUST, *Assistant Examiner.*